Feb. 11, 1969  G. B. FOSTER  3,426,547
CONTROL OF ABSORPTION REFRIGERATION SYSTEMS
Filed Nov. 13, 1967
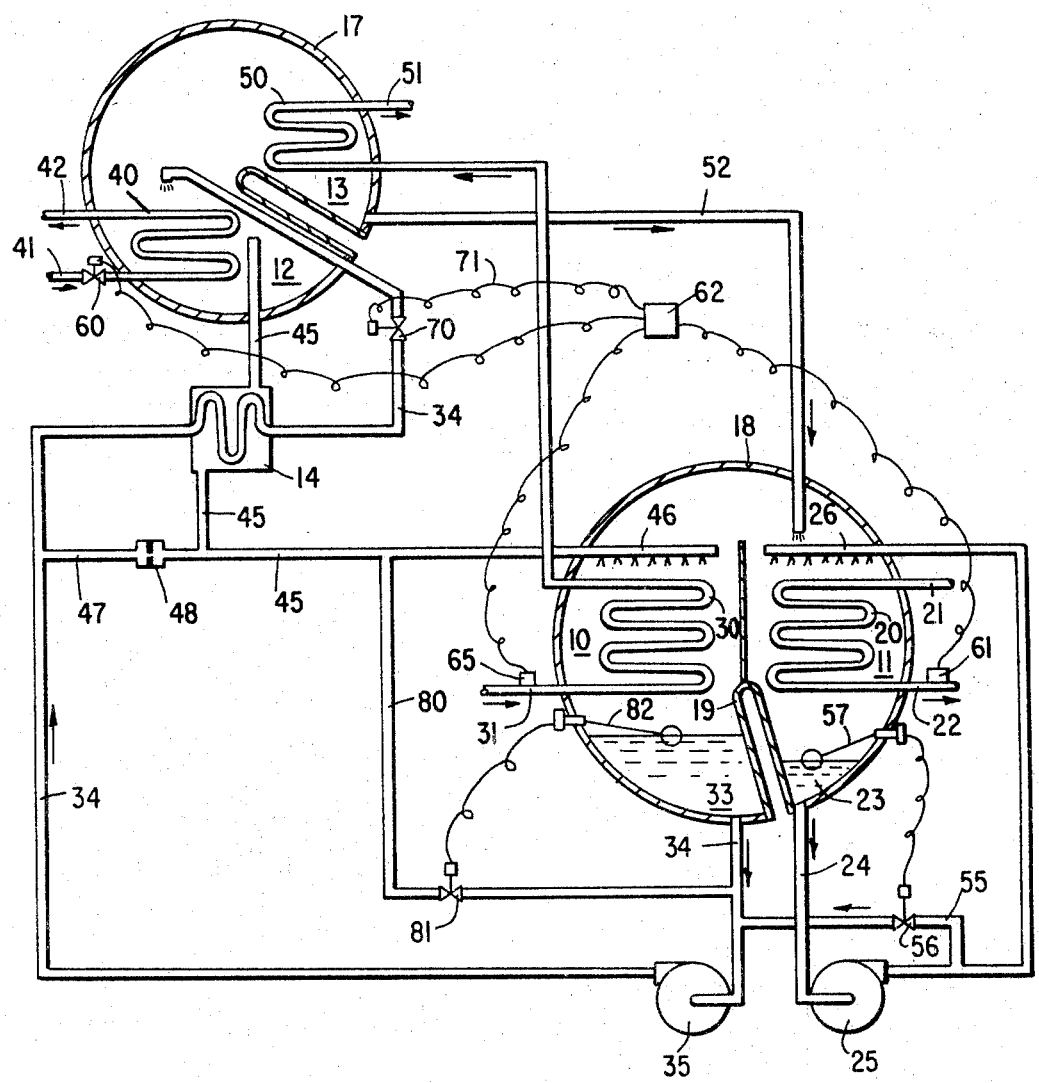
INVENTOR.
GLENN B. FOSTER.
BY
Frank N Decker Jr.
ATTORNEY.

United States Patent Office 3,426,547
Patented Feb. 11, 1969

3,426,547
CONTROL OF ABSORPTION REFRIGERATION
SYSTEMS
Glenn B. Foster, Liverpool, N.Y., assignor to Carrier Corporation, Syracuse, N.Y., a corporation of Delaware
Filed Nov. 13, 1967, Ser. No. 682,254
U.S. Cl. 62—101                              12 Claims
Int. Cl. F25b 15/00, 39/00

ABSTRACT OF THE DISCLOSURE

An absorption refrigeration control system having a steam valve responsive to leaving chilled water temperature from the evaporator for modulating supply of steam to the generator, a solution control valve responsive to leaving chilled water temperature from the evaporator for reducing the quantity of solution supplied to the generator under conditions of relatively low refrigeration demand, and a strong solution bypass passage and a solution bypass valve responsive to the level of absorbent solution in the absorber for bypassing strong solution around the absorber upon a rise in level of solution therein above a predetermined level.

Background of the invention

This invention relates to an absorption refrigeration system having an evaporator for evaporating refrigerant to produce refrigeration, an absorber for absorbing refrigerant vapor formed in the evaporator into an absorbent solution, a generator for concentrating absorbent solution and separating the refrigerant therefrom by heating an absorbent solution, and a condenser for condensing refrigerant vapor formed in the generator.

In such systems, it is often desirable to provide some type of heating medium control means for regulating the supply of heating medium to the generator in response to a suitable condition of operation of the system, such as the temperature of leaving chilled water from the evaporator, which is a function of the refrigeration demand imposed on the system. By reducing the supply of heating medium to the generator, the capacity of the generator, and consequently the capacity of the refrigeration system is reduced.

It is also often desirable to reduce the quantity of weak absorbent solution passing to the generator when the refrigeration demand on the system is relatively low in order to increase efficiency of the system by reducing the heat required to boil the absorbent solution in the generator. Reducing the solution flow also increases the efficiency of the machine at low loads by maintaining the temperature difference across the solution heat exchanger high so that substantial preheating of weak absorbent solution is achieved before its passage to the generator.

While the control systems described effectively control the capacity of the generator, they frequently fail to provide a corresponding change in the capacity of the absorber. For example, if the generator capacity is reduced, by either reducing the heating medium input or the solution flow thereto, or by doing both simultaneously, the strong solution passed to the absorber is still capable of absorbing a large quantity of refrigerant vapor from the evaporator. Unless a large refrigerant storage volume is provided in the system, there is the possibility that the refrigerant in the evaporator may be reduced to an extent that the suction head on the refrigerant pump becomes too low for safe operation of the pump. When the suction head on the pump is reduced below some minimum value, cavitation and damage to the pump may occur.

It is also frequent practice to provide control means, such as a cooling tower bypass valve and control arrangement, to prevent the temperature of the cooling water supplied to the heat exchangers in the absorber and the condenser from dropping below some predetermined value. A drop in the temperature of the chilled water passing through the absorber heat exchanger may cause the absorbent solution in the absorber to have an unusually high affinity for refrigerant vapor. Under these conditions, the danger of the suctio nhead on the refrigerant pump becoming dangerously low also exists. However, it is highly desirable to operate the absorption refrigeration system without controlling the temperature of cooling medium supplied to the absorber, both to eliminate the expense involved in controlling its temperature and because allowing it to drop in temperature increases the efficiency of the system by reducing the temperature at which the system is required to reject heat.

Accordingly, it is the principal object of this invention to provide improved control of an absorption refrigeration system, whereby the capacity of both the absorber and generator may be simultaneously varied to prevent damage to the refrigerant pump by excessive absorption of refrigerant vapor.

Summary of the invention

In accordance with this invention, there is provided a strong solution bypass passage having a solution bypass valve therein to bypass strong absorbent solution out of contact with the absorber heat exchanger under conditions where it is desired to reduce the absorber capacity to prevent excessive absorption of refrigerant vapor.

Preferably, a float control is provided in an absorbent solution sump in the absorber to sense the level of absorbent solution therein. Under conditions of excessive absorber capacity or very light load, a large quantity of refrigerant is absorbed into the solution into the absorber causing over-dilution of the solution. When the solution becomes over-diluted, its volume increases above a predetermined level in the absorbent solution sump. When the predetermined level of solution is exceeded in the absorber sump, the bypass valve in the strong solution bypass passage is opened to reduce the quantity of strong absorbent solution, which is passed over the absorber heat exchanger.

Bypassing absorbent solution, in accordance with this invention, out of contact with the absorber heat exchanger, achieves two beneficial effects. First, the quantity of strong absorbent solution, which is cooled and available for absorption of refrigerant vapor in the absorber, is immediately reduced. Consequently, more refrigerant accumulated in the evaporator and the likelihood of "starving" the refrigerant pump is reduced. Second, because of the corresponding reduction in absorber capacity, less cooling is done by the evaporator, which raises the generator temperature due to opening of the heating medium valve, which is responsive to leaving chilled water temperature from the evaporator. Consequently, more refrigerant is boiled off of the absorbent solution in the generator, and this additional refrigerant is condensed in the condenser and returned to the evaporator, so as to provide sufficient head on the evaporator pump to prevent damage thereto.

Brief description of the drawing

The drawing illustrates a schematic flow diagram of an absorption refrigeration system having a control system in accordance with a preferred embodiment of this invention.

Description of the preferred embodiment

Referring to the drawing, there is shown an absorption refrigeration system comprising an absorber 10, a refrigerant evaporator 11, a generator 12, a refrigerant condenser 13, and a solution heat exchanger 14 arranged in a refrigeration circuit. Absorber 10 and refrigerant evaporator 11 are preferably disposed side by side in a common shell 18 and are separated by a portion 19. Similarly, generator 12 and condenser 13 may be disposed in a common shell 17.

A suitable refrigerant for the system described is water and a suitable absorbent solution is a hygroscopic aqueous solution of lithium bromide. As used herein, the term "strong" solution describes a concentrated solution of absorbent which is strong in absorbing power, and the term "weak" solution is used to describe a dilute solution of absorbent which is weak in absorbing power.

Evaporator 11 comprises an evaporator heat exchanger 20 for the circulation therethrough of a fluid medium, such as water, being cooled by heat exchange relation with evaporating refrigerant. The fluid is chilled by passage through heat exchanger 20 and is circulated through outlet passage 22 to a suitable remote heat exchanger (not shown) where it absorbs heat from a refrigeration or air conditioning load. The fluid medium is then returned to the evaporator through inlet line 21 for recooling. The lower portion of the evaporator between shell 18 and partition 19 forms a refrigerant sump 23 for the accumulation of unevaporated refrigerant. Refrigerant recirculation passage 24 and refrigerant pump 25 convey refrigerant to spray headers 26 which discharge liquid refrigerant over evaporator heat exchanger 20 to absorb heat from the fluid being cooled.

Absorber 10 comprises an absorber heat exchanger 30 having an inlet passage 31 and an outlet passage 32 for passing a cooling medium in heat exchange relation with absorbent solution to cool the absorbent solution and to promote absorption of refrigerant vapor into the solution. The cooling medium is preferably water, which has been cooled by evaporation in a cooling tower (not shown). The lower portion of absorber 10 between partition 19 and shell 18 comprises an absorber sump 33 for the accumulation of absorbent solution. Solution from absorber sump 33 passes through weak solution passage 34 and is pumped by weak solution pump 35 through the interior passage of solution heat exchanger 14 to generator 12 for concentration therein.

Generator 12 comprises a generator heat exchanger 40 having an inlet passage 41 and an outlet passage 42 for passing a heating medium in heat exchange relation with absorbent solution in the generator. In the embodiment illustrated, the heating medium is preferably steam, although it will be appreciated that other media, such as hot water or combustion gas from a gas burner, may be employed. The absorbent solution in the generator is concentrated by boiling the vaporized refrigerant from the weak solution, thereby forming a strong absorbent solution. The strong absorbent solution is discharged from the generator through strong solution passage 45. For illustration, the strong solution passage has been shown to extend a substantial height above the bottom of shell 17 to maintain a level of solution in the generator, although other weir arrangements to achieve the same result may be employed.

The hot strong solution from generator 12 passes via strong solution passage 45 through the exterior passage of solution heat exchanger 14 and is discharged through absorber spray header 46 over absorber heat exchanger 30. The strong solution preheats the weak solution in heat exchanger 14 to reduce the heat input required in the generator, thereby cooling the strong solution. The cooled strong solution is then further cooled in absorber 10 by heat exchange with the cooling medium passing through absorber heat exchanger 30 to promote the absorption of refrigerant vapor into the strong solution.

A weak solution bleed passage 47 having a suitable restriction 48 therein is disposed to bleed a small quantity of weak solution from weak solution passage 34 into strong solution passage 45 to increase the quantity of solution passing through spray headers 46 sufficiently to obtain complete wetting of absorber heat exchanger 30 under full load operating conditions.

Condenser 13 comprises a condenser heat exchanger 50 having an inlet connected to outlet passage 32 from absorber heat exchanger 30, and having an outlet 51 for the passage of cooling medium through the condenser heat exchanger. The cooling medium, preferably water, is passed from absorber heat exchanger 30 through condenser heat exchanger 50, through passage 51, to a cooling tower (not shown), where it is cooled and returned via passage 31. Refrigerant vapor separated from absorbent solution in generator 12 passes into condenser 13 in heat exchange relation with the cooling medium, thereby condensing the refrigerant vapor. The condensed refrigerant passes through refrigerant liquid passage 52 into sump 23 of evaporator 11 and is sprayed over evaporator heat exchanger 20 to cool the refrigeration load.

A dilution control system is preferably incorporated to prevent over-concentration of absorbent solution, particularly under conditions of low entering cooling medium to prevent crystallization of absorbent solution in the solution heat exchanger or in the absorber. The dilution control comprises a dilution line 55 having a dilution valve 56 therein. Dilution line 55 extends between the discharge of refrigerant pump 25 and the inlet of weak solution pump 35. A refrigerant float control 57 is disposed in sump 23. Float control 57 is arranged to electrically, pneumatically or mechanically open dilution valve 56 upon accumulation of refrigerant in sump 23 in excess of a predetermined level.

In accordance with this invention, a heating medium control valve 60 is disposed in inlet line 41 to generator heat exchanger 40 and arranged to control the passage of heating medium to the generator. A temperature sensor 61 is secured at a suitable location, such as line 22, to provide a control signal which is a function of the refrigeration demand imposed on the system. It will be appreciated that the temperature of chilled water leaving evaporator 11 through line 22 or the temperature within the evaporator is a function of the heat being absorbed from the refrigeration load. Thus, temperature sensor 61 is responsive to the demand imposed on the system. Sensor 61 provides an electrical, pneumatic or mechanical control signal to operate a suitable control relay 62 for positioning heating medium valve 60. In the case of a pneumatic control system, control relay 62 may comprise a pneumatic relay of conventional design.

A limit control including a temperature sensor 65 sensing the temperature of cooling medium entering absorber heat exchanger 30 may be connected to control relay 62 to limit the opening of heating medium valve 60 under conditions of entering cooling medium below a predetermined temperature. For example, in a pneumatic system, sensor 65 may provide a control signal to a pneumatic relay in control 62 which serves to reset the control temperature of the pneumatic relay to a higher effective chilled medium or evaporator temperature. This prevents heating medium to the generator under conditions of low absorber and condenser temperature to prevent excessively violent boiling of absorbent solution in the generator and carryover into the condenser.

A solution control valve 70 is disposed in weak solution line 34, preferably between the outlet of heat exchanger 14 and generator 12. If heating medium valve 60 is of the modulating type, solution control valve 70 may be of the stepwise adjustment type, having two or more conditions of solution flow restriction. Alternatively, heating medium valve 60 may be of the stepwise adjustment type and solution control valve 70 may be of the modulating type. Solution valve 70 is connected by a control line 71 to a suitable control signal source, such as control relay 62, to position the solution valve in accordance with the refrigeration demand imposed on the system. Various methods of positioning valve 70 are envisioned within the scope of this invention. For example, in a pneumatic system, line 71 may be a pneumatic line which senses the control signal pressure provided to valve 60, which is derived from temperature sensor 61. Valve 70 is arranged to reduce the solution flow to the generator when the signal to heating medium valve 60 is reduced below a predetermined level indicative of a light refrigeration load on the system. Valve 70 may be mechanically connected to sense the mechanical position of valve 60, which in turn is responsive to the temperature sensed by temperature sensor 61 and arranged so that when the heating medium valve closes below a predetermined position, valve 70 closes to a reduced solution flow condition. Alternatively, valve 60 may sense the position of valve 70 which in turn may be directly responsive to temperature sensor 61. Various other modifications of the control arrangement are within the scope of this invention, whereby both the heating medium valve and the solution control valve are ultimately responsive to the refrigeration demand on the system.

In accordance with this invention, there is provided a strong solution bypass passage 80 which is connected to the strong solution line between the solution heat exchanger 14 and absorber spray header 46. The other end of the strong solution bypass passage 80 is shown, for purpose of illustration, as being connected to weak solution passage 34 between absorber 10 and the inlet of weak solution pump 35, which in turn is ahead of solution heat exchanger 14.

Strong solution bypass passage 80 is provided with a strong solution bypass valve 81, which is preferably of a two step type, providing two conditions of flow restriction through bypass passage 80. If desired, strong bypass valve 81 may be of the modulating type or may provide any desired plurality of flow restriction conditions.

A level responsive float device 82 is provided to sense the level of absorbent solution in absorber sump 33 of absorber 10. The solution flow restriction condition of strong solution bypass valve 81 is controlled by the absorbent level sensed by float device 82 either pneumatically, electrically or mechanically. For example, float device 82 may be an electrical switch which is closed to energize valve 81 to a less restricted condition, upon the occurrence of a level of solution in sump 33 above a predetermined level. Alternatively, float device 82 may be mechanically connected to a float actuated valve 81 to open the bypass passage upon the occurrence of a predetermined level of absorbent solution in sump 33.

In operation, if absorber 10 exhibits a condition of over capacity relative to generator 12, the level of solution in sump 33 will rise. The level of absorbent solution in sump 33 is inversely proportional to the concentration of weak absorbent solution therein. Excess absorber capacity will manifest itself by over-absorption of refrigerant vapor and an over-dilution condition of the weak absorbent solution in sump 33 which is reflected by an excessive solution level therein. Strong solution bypass valve is preferably completely closed in normal operation.

When the level of absorbent solution in sump 33 has reached the predetermined level, as sensed by level responsive device 82, strong solution bypass valve 81 will open to a less restricted condition, so that strong solution will bypass absorber heat exchanger 30 through strong solution bypass passage 80. Bypassing of the strong solution out of contact with absorber heat exchanger 30 will result in less total absorbent solution passing over absorber heat exchanger 30 and less absorbent solution being cooled in absorber 10. It should be noted that no absorber recirculation pump is employed, so bypassing strong solution substantially reduces the quantity of absorbent solution cooled in absorber 10 by heat exchange with the cooling medium passing through absorber heat exchanger 30. The area of absorber heat exchanger 30 wetted with absorbent solution will be substantially reduced when strong solution bypass passage 80 is opened, because insufficient solution is passed over the heat exchanger to completely wet it, so that the effective area of the absorber heat exchanger is substantially reduced. Consequently, the capacity of the absorbent to absorb refrigerant vapor will correspondingly be reduced. This will result in less refrigerant vapor being evaporated in evaporator 11 and the level of unevaporated refrigerant in evaporator sump 23 will rise. Thus, the likelihood of damage to refrigerant pump 25 by insufficient suction head provided by refrigerant sump 33 will be reduced.

At the same time, when bypass valve 81 is opened and the absorber capacity is reduced, the temperature of leaving chilled water through line 22 tends to rise. The rise in chilled water temperature in line 22 will be sensed by temperature sensor 61 which will cause heating medium valve 60 to supply more heat to the generator. This in turn will cause more refrigerant to be boiled from solution in the generator, thus creating more refrigerant vapor which will be condensed in condenser 13 and supplied to evaporator 11 to protect refrigerant pump 25 from starvation.

The apparent increase in refrigeration load, which is sensed by temperature sensor 61, may be sufficient to increase the solution flow to the generator by opening solution valve 70 to a less restricted condition under some conditions, if desired. It will be apparent that opening the solution valve 70 to a less restricted condition will further increase the quantity of refrigerant vapor formed in the generator and will increase the condensed refrigerant supplied to refrigerant sump 23.

Strong solution bypass passage 80 has been shown as terminating at the inlet of weak solution pump 35. It will be apparent, however, that bypass passage 80 may be incorporated within absorber 10 and may terminate in absorber sump 33 to function within the scope of this invention. Hence, in the system shown, such an arrangement would effectively bypass strong solution out of contact with absorber heat exchanger 30. It will also be apparent that means of controlling the generator capacity may be employed other than those illustrated in the preferred embodiment. For example, either heating medium valve 60 or solution valve 70 could be omitted or they could be responsive to other conditions of operation of this system, if desired. Similarly, bypass valve 81 may be responsive to the level of either absorbent solution in absorber sump 33 or of refrigerant liquid in evaporator sump 23, it being appreciated that in the latter instance valve 81 will open in response to the sensing of a level of refrigerant below a predetermined level thereof.

While, for purposes of illustration, the preferred embodiment of this invention has been shown, it will be appreciated that the invention may be otherwise embodied within the scope of the following claims.

I claim:
1. An absorption refrigeration system comprising:
   (A) an evaporator including an evaporator heat exchanger for evaporating refrigerant in heat exchange relation with a fluid medium being cooled;
   (B) an absorber including an absorber heat exchanger and solution distributor means for passing absorbent solution in heat exchange with a cooling medium to promote absorption of refrigerant vapor from the evaporator into the cooled absorbent solution in the absorber;

(C) a generator including a generator heat exchanger for passing heating medium in heat exchange relation with absorbent solution to concentrate the solution by vaporizing refrigerant therefrom;

(D) a condenser including a condenser heat exchanger for passing a cooling medium in heat exchange relation with refrigerant vaporized in the generator to condense the refrigerator;

(E) weak solution passage means for passing weak absorbent solution from the absorber to said generator for concentration therein;

(F) strong solution passage means for passing strong absorbent solution from said generator to the absorber for absorption of refrigerant vapor therein;

wherein the improvement comprises:

(G) said strong solution passage means being connected to said absorber distributor for distribution of strong solution from said generator over said absorber heat exchanger;

(H) strong solution bypass passage means for bypassing strong absorbent solution from said strong solution passage means out of contact with said absorber heat exchanger so that a portion of the strong absorbent solution passing through said strong solution passage means is diverted from passing over the absorber heat exchanger; and (I) solution bypass valve means for varying the quantity of strong absorbent solution bypassed through said strong solution bypass passage means in response to a condition of operation of said system to vary the capacity of said absorber in accordance with the conditions of operation of said system.

2. An absorption refrigeration system as defined in claim 1 wherein said solution bypass valve is responsive to the level of a liquid in said system.

3. An absorption refrigeration system as defined in claim 1 including (A) an absorber sump;
(B) level responsive means associated with said absorber sump for sensing the level of absorbent solution therein; and
(C) said strong solution bypass valve means presenting a flow restriction in said strong solution bypass passage responsive to the level of absorbent solution sensed in said absorber sump, said bypass valve responding such that said flow restriction is reduced and a substantial quantity of absorbent solution is bypassed through said bypass passage upon sensing of a level of absorbent solution in said absorber sump above a predetermined level.

4. An absorption refrigeration system as defined in claim 1 including (A) a solution heat exchanger connected in said strong solution passage and in said weak solution passage for passing weak absorbent solution in heat exchange relation with strong absorbent solution; and
(B) said strong solution bypass passage being connected to said strong solution passage at a point between said solution heat exchanger and said absorber, to a location such that the bypassed strong absorbent solution is returned to the generator through said weak solution passage and said solution heat exchanger.

5. An absorption refrigeraton system as defined in claim 1 including (A) a solution heat exchanger connected in said strong solution passage and in said weak solution passage for passing weak absorbent solution in heat exchange relation with strong absorbent solution;
(B) said strong solution bypass passage being connected to said strong solution passage at a point between said solution heat exchanger and said absorber, to a location such that the bypassed strong absorbent solution is returned to the generator through said weak solution passage and said solution heat exchanger;

(C) heating medium control means for varying the supply of heat to said generator in response to a condition of operation of said system; and (D) a solution control valve disposed in the weak solution passage for varying the passage of strong absorbent solution from the generator to the absorber in accordance with a condition of operation of said system.

6. A method of producing refrigeration from an absorption refrigeration system having an evaporator for cooling a fluid medium by evaporating refrigerant, an absorber, including an absorber heat exchanger, for absorbing refrigerant evaporated in the evaporator into an absorbent solution, a generator for concentrating absorbent solution by heating absorbent solution and vaporizing refrigerant therefrom, and a condenser for condensing refrigerant vaporized in the generator, comprising the steps of, passing absorbent solution from the generator to the absorber into heat exchange relation with a cooling medium in the absorber, thereby cooling said absorbent solution and promoting absorption of refrigerant vapor therein; passing absorbent solution from the absorber to the generator into heat exchange with a heating medium in the generator, thereby heating the absorbent solution and separating refrigerant therefrom;

wherein the improvement comprises controlling the refrigeration capacity of the system by (A) sensing a condition of operation of the system related to the concentration of the weak absorbent solution therein; and
(B) bypassing a quantity of strong absorbent solution passing from the generator out of contact with the absorber heat exchanger to avoid substantial heat exchange between the bypassed absorbent solution and the cooling medium in the absorbent, thereby lessening the capability of the absorber to absorb refrigerant vapor upon sensing a concentration of weak absorbent solution lower than a predetermined concentration.

7. A method of producing refrigeration from an absorption refrigeration system as defined in claim 6 wherein the step of bypassing strong absorbent solution includes the step of simultaneously varying the total quantity of absorbent solution cooled in the absorber by heat exchange with the cooling medium.

8. A method of producing refrigeration from an absorption refrigeration system as defined in claim 6 wherein the step of bypassing strong absorbent solution includes the step of simultaneously varying the effective area of absorber heat exchange surface in contact with absorbent solution.

9. A method of producing refrigeration as defined in claim 6 wherein the step of sensing a condition of operation of the system includes sensing a level of absorbent solution in the absorber; and the step of bypassing said quantity of absorbent solution is performed upon sensing of a level of absorbent solution in the absorber in excess of a predetermined level.

10. A method of producing refrigeration as defined in claim 6 including the step of returning bypassed strong absorbent solution to the generator.

11. A method of producing refrigeration as defined in claim 6 including the step of varying the flow of strong solution from the generator to the absorber in response to the refrigeration demand imposed on the system.

12. A method of producing refrigeration as defined in claim 6 including the step of controlling the capacity of the refrigeration system by varying the heat input to the generator in response to a condition of operation of the system.

(References on following page)

References Cited

UNITED STATES PATENTS

| | | | |
|---|---|---|---|
| 2,237,302 | 4/1941 | Flukes | 62—141 |
| 3,054,272 | 9/1962 | Leonard | 62—489 |
| 3,122,002 | 2/1964 | Miner et al. | 62—476 |
| 3,206,947 | 9/1965 | Bourne et al. | 62—476 |
| 3,292,385 | 12/1966 | Murray | 62—476 |
| 3,320,760 | 5/1967 | Swearingen | 62—141 |

LLOYD L. KING, *Primary Examiner.*

U.S. Cl. X.R.

62—476, 141, 489

UNITED STATES PATENT OFFICE
CERTIFICATE OF CORRECTION

Patent No. 3,426,547                                February 11, 1969

Glenn B. Foster

It is certified that error appears in the above identified patent and that said Letters Patent are hereby corrected as shown below:

Column 2, line 14, "suctio nhead" should read -- suction head --. Column 3, line 14, "portion" should read -- partition --. Column 6, line 17, "absorbent" should read -- absorber --. Column 7, line 10, "refrigerator" should read -- refrigerant --; line 66, "refrigeraton" should read -- refrigeration --. Column 8, line 37, "absorbent" should read -- absorber --.

Signed and sealed this 24th day of March 1970.

(SEAL)
Attest:

Edward M. Fletcher, Jr.                          WILLIAM E. SCHUYLER, JR.
Attesting Officer                                         Commissioner of Patents